US012497141B1

(12) United States Patent
Sudhir Singh et al.

(10) Patent No.: US 12,497,141 B1
(45) Date of Patent: Dec. 16, 2025

(54) NAVIGATION CONTROL SYSTEM AND METHOD FOR A MARINE VESSEL

(71) Applicant: Brunswick Corporation, Mettawa, IL (US)

(72) Inventors: Rakshith Sudhir Singh, Peoria, IL (US); Brandon L. Tate, Walnut Hill, IL (US); Trevor George, Savoy, IL (US); Eric S. Mueller, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 356 days.

(21) Appl. No.: 17/944,410

(22) Filed: Sep. 14, 2022

(51) Int. Cl.
*B63B 49/00* (2006.01)
*B63B 17/00* (2006.01)
*G05D 1/00* (2024.01)

(52) U.S. Cl.
CPC .............. *B63B 49/00* (2013.01); *B63B 17/00* (2013.01); *G05D 1/0206* (2013.01)

(58) Field of Classification Search
CPC ........ B63B 49/00; B63B 17/00; G05D 1/0206
USPC .......................................................... 701/21
See application file for complete search history.

(56) References Cited

U.S. PATENT DOCUMENTS

| | | | | |
|---|---|---|---|---|
| 6,469,664 B1 * | 10/2002 | Michaelson | ........... | G01C 21/22 367/909 |
| 7,027,615 B2 * | 4/2006 | Chen | ..................... | G01S 13/931 382/104 |
| 7,688,187 B2 * | 3/2010 | Caird | ........................ | B60R 9/04 340/432 |
| 8,212,660 B2 * | 7/2012 | Nugent | ................... | B60Q 9/006 340/901 |
| 8,510,046 B2 * | 8/2013 | Kabel | .................... | G01C 21/22 701/410 |
| 8,614,633 B1 * | 12/2013 | Lear | ...................... | G08B 29/188 340/984 |
| 9,089,928 B2 * | 7/2015 | Zediker | .............. | B23K 26/0096 |
| 9,273,979 B2 * | 3/2016 | Su | ...................... | G01C 21/3632 |
| 9,727,220 B2 * | 8/2017 | Matsumoto | ......... | G06F 3/04847 |
| 10,156,635 B2 * | 12/2018 | Sorenson | .............. | G01S 17/931 |
| 10,198,005 B2 | 2/2019 | Arbuckle et al. | | |
| 10,248,120 B1 * | 4/2019 | Siegel | .................. | G05D 1/0223 |
| 10,281,917 B2 * | 5/2019 | Tyers | ................... | G01C 21/203 |

(Continued)

FOREIGN PATENT DOCUMENTS

| | | | | |
|---|---|---|---|---|
| EP | 3118101 | | 9/2018 | |
| GB | 2500325 A | * | 9/2013 | ........... G01C 13/008 |

OTHER PUBLICATIONS

Unpublished U.S. Appl. No. 17/711,224.

*Primary Examiner* — Luis A Martinez Borrero
(74) *Attorney, Agent, or Firm* — Andrus Intellectual Property Law, LLP

(57) ABSTRACT

A navigation system for a marine vessel comprises a ranging sensor and a control system. The ranging sensor is arranged to image an area around the marine vessel, such as an area forward of the bow, and generate ranging data. The control system is configured to receive ranging data from the ranging sensor, detect a navigable opening based on the ranging data, determine a height of the navigable opening, determine whether the marine vessel can safely navigate through the navigable opening based on the height of the navigable opening, and generate a navigation action based on whether the marine vessel can navigate through the navigable opening.

24 Claims, 7 Drawing Sheets

(56) References Cited

U.S. PATENT DOCUMENTS

| | | | |
|---|---|---|---|
| 10,371,816 B2* | 8/2019 | Seifert | G01S 15/89 |
| 10,775,177 B2* | 9/2020 | Rivers | G05D 1/0206 |
| 10,926,855 B2 | 2/2021 | Derginer et al. | |
| 11,373,537 B2* | 6/2022 | Derginer | B63B 43/18 |
| 11,443,637 B2* | 9/2022 | Malouf | G01S 7/53 |
| 11,556,130 B2* | 1/2023 | Tyers | B63H 25/04 |
| 11,630,198 B2* | 4/2023 | Rivers | G01S 13/867 |
| | | | 342/179 |
| 11,733,699 B2* | 8/2023 | Johnson | G01S 7/003 |
| | | | 701/21 |
| 11,794,865 B1* | 10/2023 | Derginer | G01C 21/20 |
| 11,804,137 B1* | 10/2023 | Derginer | G08G 3/02 |
| 11,904,996 B2* | 2/2024 | Derginer | G05D 1/0875 |
| 11,921,218 B2* | 3/2024 | Heling | G01S 7/4817 |
| 12,008,482 B2* | 6/2024 | Krishnamachar | G08G 1/0129 |
| 12,046,144 B2* | 7/2024 | Malouf | B63B 49/00 |
| 2004/0183661 A1* | 9/2004 | Bowman | G08G 1/165 |
| | | | 342/70 |
| 2007/0138347 A1* | 6/2007 | Ehlers | G01C 21/3461 |
| | | | 246/1 R |
| 2010/0121577 A1* | 5/2010 | Zhang | G06V 20/588 |
| | | | 382/104 |
| 2015/0346726 A1* | 12/2015 | Davoodi | B63B 22/20 |
| | | | 440/38 |
| 2016/0125739 A1* | 5/2016 | Stewart | B63B 43/18 |
| | | | 701/301 |
| 2016/0356594 A1* | 12/2016 | Sorenson | G08G 1/161 |
| 2017/0210449 A1* | 7/2017 | Frisbie | B63B 49/00 |
| 2017/0323154 A1 | 11/2017 | Kollmann et al. | |
| 2018/0004209 A1* | 1/2018 | Akuzawa | G05D 1/0206 |
| 2018/0094934 A1* | 4/2018 | Rivers | G05D 1/0206 |
| 2018/0105236 A1* | 4/2018 | Bhageria | G01C 21/203 |
| 2018/0127027 A1* | 5/2018 | Brennan | B62D 13/06 |
| 2018/0143300 A1* | 5/2018 | Dussan | G01S 7/4814 |
| 2018/0180736 A1* | 6/2018 | Masuda | G01S 17/87 |
| 2018/0266068 A1* | 9/2018 | Rines | E02B 7/50 |
| 2019/0179028 A1* | 6/2019 | Pacala | H01F 38/14 |
| 2019/0359300 A1* | 11/2019 | Johnson | G01S 13/867 |
| 2019/0361457 A1* | 11/2019 | Johnson | G05D 1/0206 |
| 2020/0160725 A1 | 5/2020 | Derginer et al. | |
| 2020/0160726 A1* | 5/2020 | Malouf | G05D 1/0206 |
| 2020/0247518 A1* | 8/2020 | Dannenberg | B63H 21/21 |
| 2020/0256967 A1* | 8/2020 | Wigh | G01S 7/521 |
| 2020/0284883 A1* | 9/2020 | Ferreira | G01S 7/4815 |
| 2020/0369351 A1* | 11/2020 | Behrendt | G06V 20/00 |
| 2020/0401143 A1* | 12/2020 | Johnson | G01C 21/203 |
| 2021/0088667 A1* | 3/2021 | Heling | G01S 17/89 |
| 2021/0166568 A1* | 6/2021 | Kersulec | G05D 1/49 |
| 2021/0206460 A1* | 7/2021 | Hawker | G05D 1/43 |
| 2021/0261226 A1* | 8/2021 | Johnson | B63B 79/15 |
| 2021/0269128 A1* | 9/2021 | Rivers | B63H 25/02 |
| 2021/0389765 A1* | 12/2021 | Behrendt | G06F 3/04815 |
| 2022/0099813 A1* | 3/2022 | Gates | G01S 17/931 |
| 2022/0207387 A1* | 6/2022 | Krishnamachar | G06N 5/02 |
| 2022/0214171 A1* | 7/2022 | Johnson | B60L 50/60 |
| 2022/0383754 A1* | 12/2022 | Malouf | G01S 13/865 |
| 2023/0059445 A1* | 2/2023 | Lammers-Meis | B63B 21/38 |
| 2023/0103359 A1* | 4/2023 | Rivers | G01C 21/203 |
| | | | 701/2 |
| 2023/0195118 A1* | 6/2023 | Singh | B63B 79/15 |
| | | | 701/21 |

* cited by examiner

NAVIGATION CONTROL SYSTEM AND METHOD FOR A MARINE VESSEL

FIELD

The present disclosure generally relates to navigation control systems for marine vessels and methods for implementing navigation control systems for marine vessels, and more specifically to control systems with ranging sensors configured to detect and analyze navigable openings in the path of a marine vessel.

BACKGROUND

The following U.S. Patents and Applications provide background information and are incorporated herein by reference, in entirety.

U.S. Pat. No. 9,952,595 discloses a method for maneuvering a marine vessel powered by a propulsion system includes accepting inputs to an electronic navigation device and generating a desired track based on the inputs. The desired track includes a series of waypoints, each waypoint in the series of waypoints being associated with a respective heading. The method Also includes sending position and orientation information corresponding to each waypoint and its associated heading to a control module. Based on the position and orientation information, the control module generates steering and thrust commands that are required to maneuver the marine vessel from a current waypoint and heading in the series to a following waypoint and heading in the series. According to the steering and thrust commands, the propulsion system thereafter propels the marine vessel along the desired track to each waypoint and its associated heading in succession. A corresponding system is also disclosed.

U.S. Pat. No. 10,198,005 discloses a method for controlling movement of a marine vessel including controlling a propulsion device to automatically maneuver the vessel along a track including a series of waypoints and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point which is at or near the stopover waypoint.

U.S. Pat. No. 10,926,855 discloses a method for controlling low-speed propulsion of a marine vessel powered by a marine propulsion system having a plurality of propulsion devices that includes receiving a desired inertial velocity of the marine vessel and determining a steering position command and an engine command for each of the plurality of propulsion devices based on the desired inertial velocity and controlling the propulsion system accordingly. An actual velocity of the marine vessel is measured and a difference between the desired inertial velocity and the actual velocity is determined, where the difference is used as feedback in subsequent steering position command and engine command determinations.

U.S. Patent Publication No. 2017/0323154 discloses an object detection system for a marine vessel having at least one marine drive including at least one image sensor positioned on the marine vessel and configured to capture an image of a marine environment on or around the marine vessel, and a processor. The object detection system further includes an image scanning module executable on the processor which receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Patent Publication No. 2020/0160725 discloses a system for proximity sensing on a marine vessel that includes a main inertial measurement unit (IMU) positioned at a main installation attitude and a main location, a first proximity sensor configured to measure proximity of objects from a first sensor location, and a first sensor IMU positioned at the first sensor location and at a first installation attitude. A sensor processor is configured to receive main IMU data from the main IMU and first IMU data from the first sensor IMU, and then determine a relative orientation transform between the main installation attitude and the first installation attitude by comparing the main IMU data and the first IMU data, and then determine a relative position transform between the main location and the first sensor location based on the relative orientation transform, the main IMU data, and the first IMU data.

U.S. Patent Publication No. 2020/0247518 discloses a marine propulsion system including at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

U.S. patent application Ser. No. 17/711,224 discloses convertible bimini top systems for a marine vessel having a deck and being situated in a body of water. The systems have a bimini top having a cover configured to extend over the deck, an actuator configured to raise and lower the cover relative to the deck, a controller communicatively coupled to the actuator, the controller being configured to operate the actuator to raise and lower the cover relative to the deck, and a sensor communicatively coupled to the controller, the sensor being configured to sense an obstruction proximate to the marine vessel. The controller is configured to automatically operate the actuator to lower the cover when the sensor senses the obstruction proximate to the marine vessel. Methods are for controlling the convertible bimini top to lower the cover relative to the deck based on the existence of the obstruction.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a navigation system for a marine vessel comprises a ranging sensor and a control system. The ranging sensor is arranged to image an area around the marine vessel, such as an area forward of the bow, and generate ranging data. The control system is configured to receive ranging data from the ranging sensor, detect a navigable opening based on the ranging data, determine a height of the navigable opening, determine whether the marine vessel can safely navigate through the navigable opening based on the height of the navigable opening, and generate a navigation action based on whether the marine vessel can navigate through the navigable opening.

In one example, the navigation action includes an alert generated on a user interface indicating to the user the system's determination of whether the marine vessel can navigate through the navigable opening given its height.

In another example, the navigation action includes controlling a propulsion system of the marine vessel to navigate the vessel through the navigable opening in response to a determination that the marine vessel can navigate through the navigable opening given its height.

In another example, the navigation action includes automatically controlling a communication device to instruct a bridge to open.

In another example, the control system is configured to determine whether the marine vessel can navigate through the navigable opening based on a comparison of the height of the navigable opening to at least one of a current height of the marine vessel from a waterline, an estimated height of the marine vessel from the waterline, and a maximum vertical displacement of the marine vessel due to environmental conditions.

In another example, the control system is further configured to detect multiple heights across a width of the navigable opening and identify a navigable region through the navigable opening based on the multiple heights and at least one of a current height of the marine vessel from a waterline, an estimated height of the marine vessel from the waterline, and a maximum vertical displacement of the marine vessel due to environmental conditions.

In one embodiment, a navigation control method for a marine vessel includes imaging an area around the marine vessel with at least one ranging sensor to generate ranging data, detecting a navigable opening in an area around the marine vessel based on the ranging data, determining a height of the navigable opening based on the ranging data and determining whether the marine vessel can navigate through the navigable opening based on the height on the navigable opening and a height of the marine vessel. A navigation action is generated based on whether the marine vessel can navigate through the navigable opening.

In one example, generating the navigation action includes generating a navigation alert via a user interface device indicating whether the marine vessel can navigate through the navigable opening.

In one example, generating the navigation action includes automatically controlling at least one propulsion device on the marine vessel to propel the marine vessel through the navigable opening.

In one example, generating the navigation action includes automatically controlling a communication device to instruct a bridge to open.

In another example, the method further includes comparing the height of the navigable opening to a reduced height of the marine vessel and determining whether the marine vessel can navigate through the navigable opening at the reduced height, wherein the navigation action includes, upon determining that the marine vessel can navigate through the navigable opening at the reduced height, automatically controlling a retractable protuberance on the marine vessel to reduce the height of the marine vessel.

In another example, the method further includes determining whether the marine vessel can navigate through the navigable opening includes comparing the height of the navigable opening to at least one of a current height of the marine vessel from a waterline, a maximum height of the marine vessel from the waterline, an estimated height of the marine vessel from the waterline, and a maximum vertical displacement of the marine vessel due to environmental conditions.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

One of the most dangerous aspects of vessel navigations is when the operator of a vessel is faced with obstructions, whether they be solid obstructions or navigable openings. Whether these obstructions must be navigated around, such as solid obstructions, or navigated through, in the case of navigable openings such as bridges or covered docks, marine vessel operators must make determinations on whether their vessel can safely navigate through the one or more navigable openings in the obstruction or must avoid the obstruction. The inventors have recognized that vessel operators are not good at assessing whether a vessel can navigate through opening, such as under bridges or into covered slips or docks, and collisions in and with navigable openings are a common source of vessel damage. Thus, the inventors have endeavored to develop improved navigation assistance systems and methods that assist an operator with and/or autonomously perform detecting and navigating through navigable openings, such as bridges, covered slips, and the like.

In view of the forgoing problems and challenges recognized by the inventors, they have developed the disclosed systems and methods to autonomously identify, measure, and evaluate navigable openings in or around the path of a vessel's movement or a range around the vessels heading. The system uses ranging sensors and computer algorithms to detect and measure the size of navigable openings, such as one or more heights and widths across each detected opening. The system then determines whether the vessel can navigate through the navigable opening based on the size measurements, such as to determine whether the vessel can fit through the passes under bridges and/or can fit in a covered docking area.

In some embodiments, the system may use chart data and GPS data in concert with the ranging data to determine whether the marine vessel can navigate through the navigable opening and/or to generate the navigation action. The navigation action may include a navigation alert advising on whether the marine vessel can fit and/or information on where the vessel can fit through the one or more navigable openings, such as a navigable region through a navigable opening or a selected navigable opening for passage when there are multiple navigable openings. This navigation alert may be displayed to a boat operator via an operation console and/or may be sent to an autonomous propulsion control system to autonomously navigate the vessel according to the information provided in the navigation alert.

Figure 1:
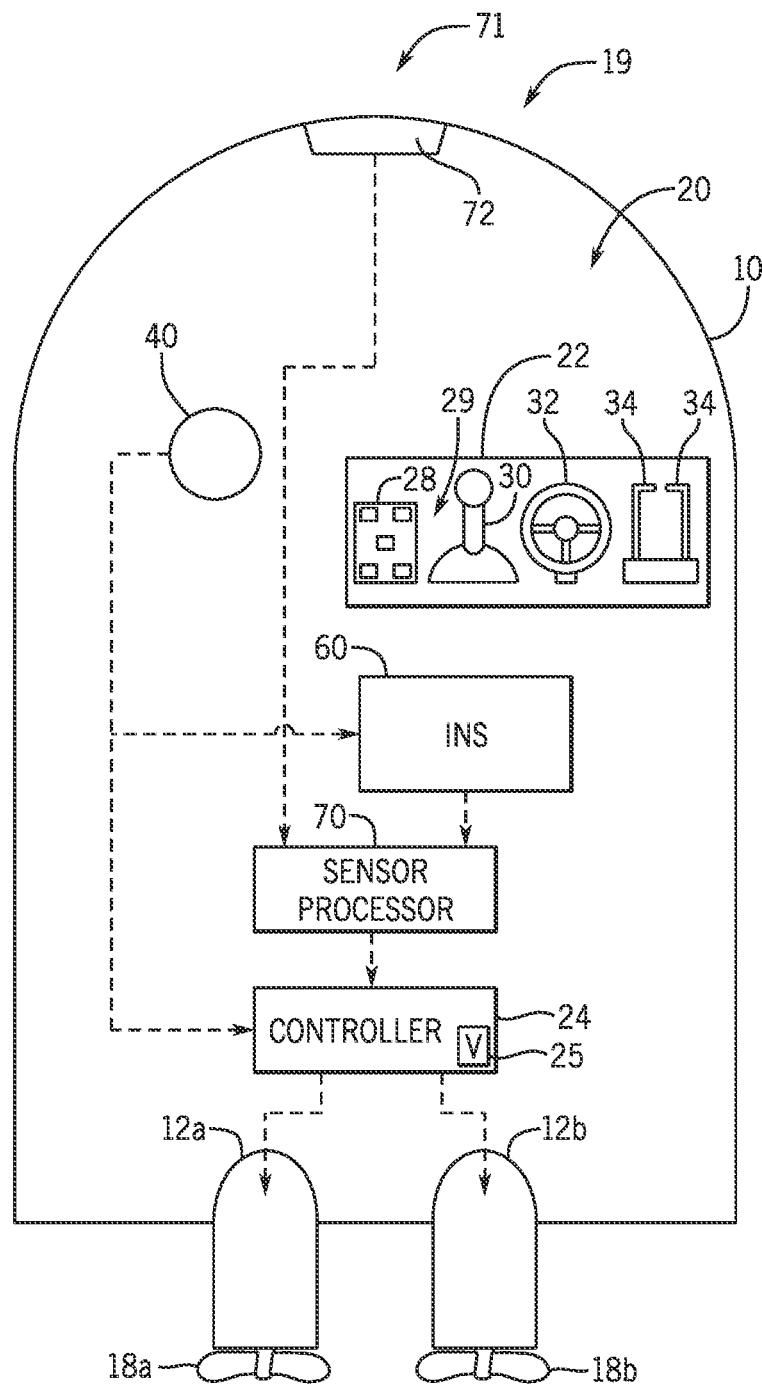
FIG. 1 is a schematic diagram representing a marine vessel having a navigation system in accordance with one embodiment of the present disclosure.
Figure 2:
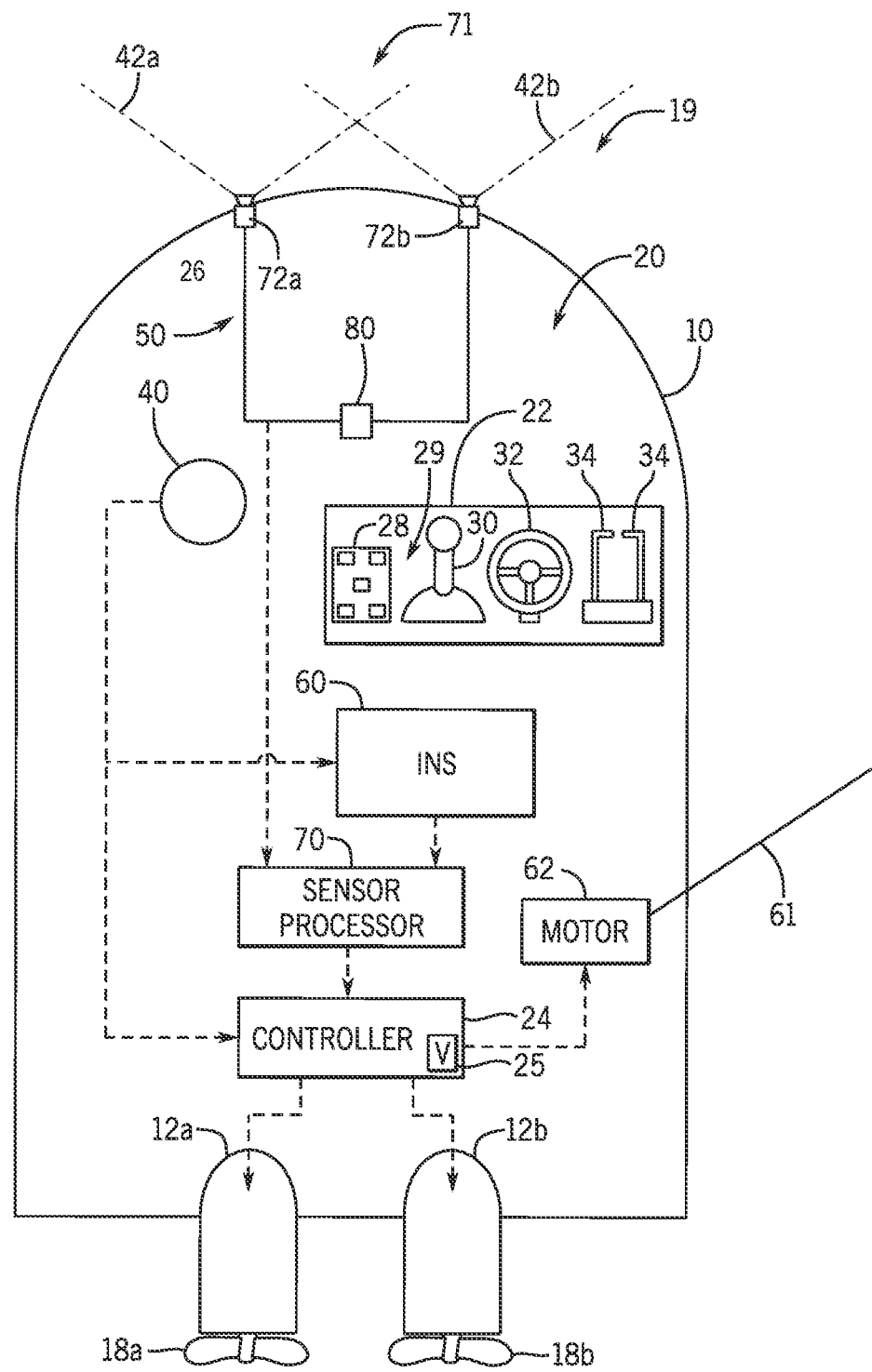
FIG. 2 is a schematic diagram representing another embodiment of a marine vessel having a navigation system in accordance with the present disclosure wherein the ranging sensor includes a stereovision camera system.

FIGS. 1 and 2 show a marine vessel 10 equipped with a navigation system 19 including a ranging sensor system 71 having one or more ranging sensors 72 and a control system 20. The navigation system 19 is configured to detect and measure the size of navigable openings around the marine vessel, such as in and around the path of the vessel's movement. After the navigation system 19 detects and evaluates the size of a navigable opening it generates a navigation action corresponding to and including information regarding whether or not the vessel can safely pass through or under the navigable opening and may include further information regarding a navigable region through or in the navigable opening, a selected navigable opening when there are a plurality of navigable openings, and/or actions that need to be taken in order to safely enter and/or pass through the navigable opening.

In one embodiment, the vessel 10 houses an operation console 22. The operation console 22 includes a number of user input devices, such as a keypad 28, a joystick 30, a steering wheel 32, and one or more throttle/shift levers 34. The operation console 22 further includes a display 29 that is configured to visually present information to the operator and present control options to the operator.

A propulsion system includes at least one propulsion device, which in the depicted example includes first and second propulsion devices 12a, 12b that each produce thrusts to propel the vessel 10. The first and second propulsion devices 12a, 12b are illustrated as outboard motors, but they could alternatively be inboard motors, stern drives, jet drives, or pod drives. Each propulsion device includes a powerhead, such as an internal combustion engine or an electric motor, that is operatively connected to and drives rotation of a propeller 18a, 18b. Each drive 12a, 12b may include a separate drive control module communicatively connected to the controller 25.

The navigation control system 20 includes one or more control elements and sensing elements communicatively connected and configured to execute the methods and systems for detecting and assessing navigable openings described herein. The control system 20 includes one or more of a sensor processor 70 configured to process ranging data from the ranging sensor 72 and one or more controllers 24, 25 configured to assess navigability of the vessel through detected navigable openings and, in some embodiments, control propulsion of the marine vessel to autonomously navigate the vessel through the opening. The control system 20 may also include propulsion controllers, such as an autonomous propulsion controller 25 programmed to control the propulsion devices 12a and 12b of the marine vessel 10, a powerhead control module configured to control each powerhead, steering controllers, etc. The autonomous propulsion controller 25 and other propulsion-related controllers may comprise part of the same processing device that makes navigation determinations with respect to navigable openings, as shown, controller 24, or may be embodied in one or more separate processing devices. The autonomous propulsion controller 25 may be configured to autonomously control propulsion of the vessel, including calculating and command thrust output and steering of the plurality of propulsion devices 12a and 12b, to propel the vessel along a path through the navigable opening.

In some embodiments, the vessel 10 houses a retractable protuberance 61. Retractable protuberance 61 is any retractable item that increases the height or width of the vessel 10, such as a retractable antenna, a retractable mast, removable fishing poles, a movable bimini top, or other movable roof structures. In some further embodiments, the control system 20, such as via controller 24, controls a motor 62 attached to retractable protuberance 61 to retract the element down or inward toward the deck of the vessel 10 to decrease the total height and/or width of the vessel. When actuated, the actuator motor 62 can retract retractable protuberance 61 to the point where retractable protuberance 61 does not increase the vessel 10 height or width. For example, the retractable protuberance 61 may be a motorized vessel top such as that shown and described in U.S. patent application Ser. No. 17/711,224, which is incorporated herein by reference. In other embodiments, the retractable protuberance may be manually retractable by an operator, such as removable fishing poles or collapsible or foldable objects. For example, the retractable protuberance 61 may be a foldable or manually moved object, such as a foldable tower on top of the vessel (e.g., as shown and described in U.S. Pat. No. 9,434,451) or a foldable bimini top or other vessel top (e.g., as shown and described in U.S. Pat. Nos. 9,139,259 and 9,114,855).

The navigation system 19 also includes a ranging sensor system 71 comprising one or more ranging sensors 72. The ranging sensors 72 are configured to provide ranging data to a sensor processor 70. The ranging sensors 72 are shown on the bow of the marine vessel 10 but could also be mounted on the sides and/or rear of the vessel 10, as well as the hardtop of the vessel 10 or in any location from which the ranging sensors 72 can generate ranging data measuring distance and/or size of objects surrounding the marine vessel, including in the direction of the vessel's movement. In some embodiments, the ranging sensor system 71 includes multiple ranging sensors 72 positioned on each side of the vessel and configured to image the entire area surrounding the vessel 10. The ranging sensor system 71 may also include ranging sensors 72 positioned and configured to view the vessel 10 itself and/or portions of the marine vessel 10, such as the vessel's upper-most portion, for real-time measurements of the vessel's dimensions including any retractable protuberance 61 extending upward or outward that could collide with or be damaged when entering or navigating through the navigable opening.

The ranging sensor 72 may include one or more of a visual light cameras, lidar sensor, radar sensor, laser scanner, or other devices capable of detecting and measuring objects around the marine vessel, including navigable openings in and around the path of the vessel 10. Each ranging sensor 72 may include one sensor element or may include multiple sensor elements, as in the case of stereo cameras. Depending on the type of ranging sensor(s) 72 utilized, the ranging data may include distance or depth information, object segmentation or other pixel labeling, object size, object type (e.g., dock, covered dock, boat lift, bridge and/or bridge type—e.g., arch bridge, beam bridge, horizontal swing opening bridge, bascule lift opening bridge, vertical lift opening bridge), or other information that may be gleaned based on images or other ranging data and/or based on GPS-based chart data.

FIG. 2 shows one embodiment of the disclosure where the ranging sensor system 71 includes a stereovision system 50. Stereovision system 50 comprises image sensors 72a and 72b, each having a field of view 42a and 42b wherein the fields of view 42 and 42b overlap in at least a portion of the area ahead of the vessel 10 sufficient such that navigable openings forward of the bow will be captured in the images of both cameras as the vessel approaches, and the image computer 80. Each image sensor 72a, 72b is a camera, enabling the image computer 80 to compare the data from each image sensor 72a, 72b and, via disparity mapping, generate appropriate depth information and ranging data. Alternatively or additionally, some portion of the stereovision image processing and generation of the ranging data may be performed at the sensor processor 70. In some embodiments, image computer 80 and/or the sensor processor 70 will segment the image data from image sensors 72a, 72b pixel by pixel, labeling relevant pixels as either water, vessel, or navigable opening (and may include more specific labeling identifying the detected type of navigable opening, such as bridge or covered slip, or labeling parts of navigable openings, such as abutment, cap pier, arch, deck, etc.).

The ranging data generation by the ranging sensor(s) 72 is processed by one or more sensor processors 70. The sensor processor 70 and/or the controller 24 is configured to detect a navigable opening, determine a height of the navigable opening, determine whether the marine vessel can navigate through the navigable opening based on the height of the navigable opening and the height of the vessel 10, and generate a navigation action based on whether the marine vessel can safely navigate through the navigable opening. In some embodiments, the sensor processor 70 utilizes an object recognition and classification technique to detect one or more navigable openings in the ranging data. Alternatively or additionally, the sensor processor 70 is arranged to utilize object detection and segmentation to identify one or more navigable openings in the ranging data, including locating where in the image(s) the navigable opening(s) is located, such as via a convolutional neural network (CNN) or other deep learning or computer vision and machine learning (CVML) techniques configured for feature extraction and object classification.

The system may also be configured to determine the height of the navigable opening, such as via distance or depth information measured by the ranging sensor system. Where the sensor system includes a lidar, laser scanner, radar, or other reflective measurement technique, the ranging data includes distance information for various points in the image or occupancy map. The height(s) and width(s) across the navigable opening can be determined based thereon. Alternatively or additionally, where the sensor system includes depth information and other ranging data gleaned from disparity mapping performed via a stereo vision arrangement.

In some embodiments of the invention the control system 20 is further configured to detect multiple heights across a width of the navigable opening. For example, if the navigable opening is a rounded or arched shape, the control system 20 may be configured to determine multiple heights across the width of each navigable opening. Alternatively or additionally, the navigation control system 20 may determine multiple widths of each navigable opening, such as multiple widths through the depth of the opening. Thus, if the opening narrows, for example, the system may account for the narrowest region of the navigable opening. Therefrom, the system can determine a navigable region for the vessel based on the vessel height and/or vessel width, such as how far from the center of the navigable opening the vessel 10 can safely navigate and/or a best path through the opening. This information is then communicated to the operator, such as via the display 29, and/or provided to a navigation sub-controller charged with controlling propulsion of the marine vessel 10.

In some embodiments, the navigation control system 20 is configured to evaluate whether the vessel can safely navigate through a detected navigable opening based on the factors above and based on a maximum vertical displacement of the vessel due to waves or vessel dynamics An inertial navigation system (INS) 60 or other vessel motion sensor capable of measuring vertical displacement is provided, such as an inertial measurement unit (IMU) 26 or other sensor capable of measuring vessel position and/or the rate of change thereof. In other examples, the vessel sensor may include an attitude and heading reference system (AHRS) that provides 3D orientation of the marine vessel 10 by integrating gyroscopic measurements, accelerometer data, and magnetometer data, a motion reference unit (MRU), tilt sensor, or any combination of these devices could be used. The vessel motion sensor 60 outputs its measurements of vessel motion to the sensor processor 70 and/or directly to the controller 24 to evaluate the maximum vertical displacement of the vessel due to waves or vessel dynamics. For example, the maximum vertical displacement may be determined as a peak vertical movement or average maximum vertical movement of a vessel as it is moved up and down by waves. For instance, the maximum vertical displacement may be measured as the peak vertical distance that a vessel moves from a neutral position parallel with the waterline or from a midpoint between a minimum position and a peak position as the vessel travels over waves. The vertical displacement may be calculated based on motion data over time, such as based on motion data averaged over multiple wave cycles.

In some embodiments, the marine vessel 10 is equipped with a global positioning system (GPS) receiver 40. The GPS receiver 40 is configured to determine a current location of the marine vessel 10. In embodiments with the GPS receiver 40 the controller 24 may be configured to detect and determine the size of navigable openings based on chart data and the current location of the marine vessel as determined by GPS receiver 40, and/or to use the chart data to supplement or validate the location, dimensions, type and/or other information for a navigable opening determined based on the ranging data.

In some embodiments, the control system 20 generates a navigation alert, which may be a visual alert provided via the display 29, an auditory alert or other notification to a user via a user interface element at the operation console 22. Alternatively, the navigation alert may be an internal provided to a navigation control algorithm within the control system 20. The navigation alert corresponds to the control system's determination of whether or not the vessel 10 can safely navigate through the detected navigable opening. The control system 20 may also display information on the display 29 or otherwise communicate to the user other information determined regarding navigational openings, such as identifying multiple navigable openings and/or the dimensions, types, statuses, etc.

Figure 3:
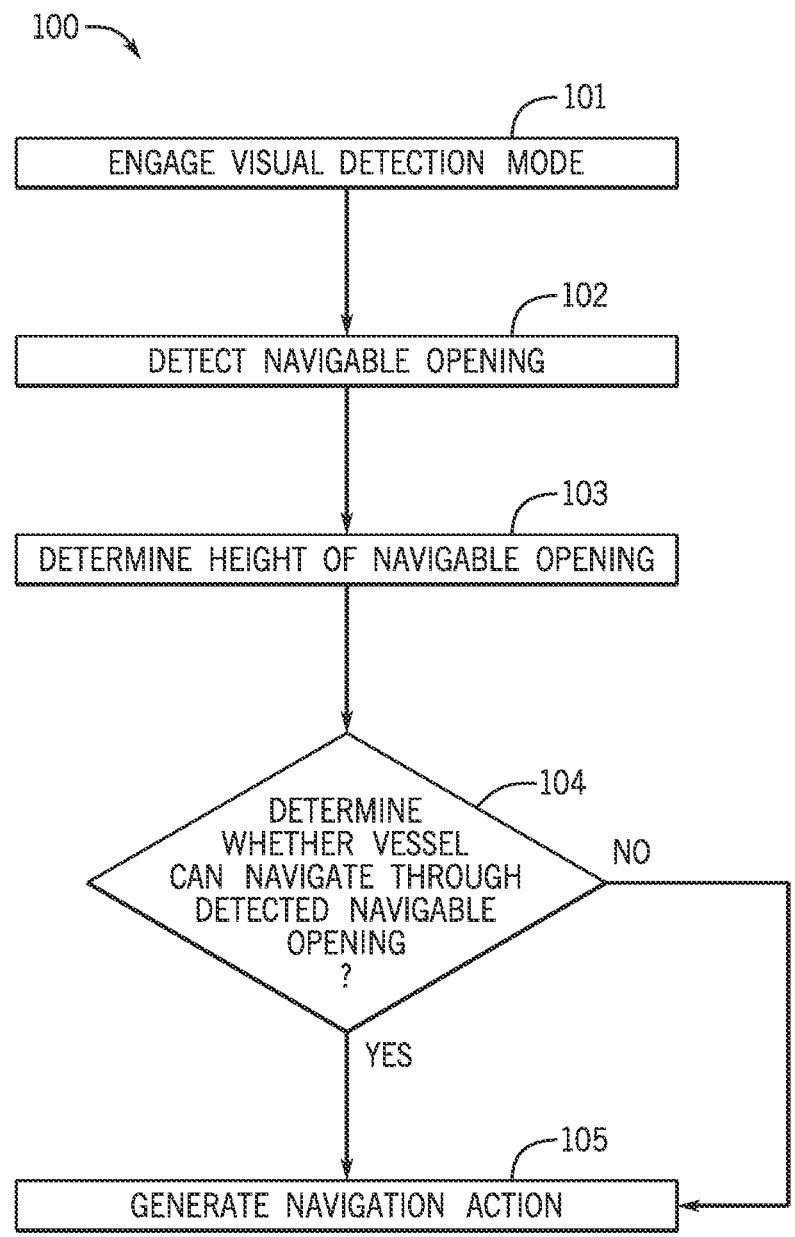
FIG. 3-7 are flow charts depicting exemplary embodiments of a method of detecting and measuring navigable openings in accordance with the present disclosure.

FIG. 3 depicts one embodiment of a method 100 of navigation control for a marine vessel. At step 101, the visual detection mode utilized by the method is engaged, either by the operator of the marine vessel 10 through input on operation console 22 or by an autonomous navigation system. For example, the navigation system may use data from GPS receiver 40 and chart data to determine when a navigable opening, such as a bridge, is expected and automatically engage the disclosed visual detection mode. At step 102, a navigable opening is detected by control system 20. Control system 20 first receives imaging data from ranging sensor 72. The imaging data is then processed, such as by sensor processor 70 and/or controller 24, to detect the navigable opening, such as via CVML or image segmentation. In step 103, the identified navigable opening is then measured by controller 24 to determine at least one height of the opening. For instance, the navigation system 20 may be configured to identify an edge or outline of the navigable opening, such based on the CVML or segmentation data, and then determine the height of the navigable opening based on depth or other dimension information associated with the pixels or image portions identified as comprising the edge.

In step 104, the controller 24 compares the height of the navigable opening to a known, measured, or determined height of the marine vessel. The height information describes the current or approximate height of the vessel from the waterline and enables the control system 20 to assess whether the vessel 10 can navigate through the navigable opening, such as under the covered slip or under a bridge. For example, the controller 24 may access a maximum height of the vessel representing the greatest height of the vessel 10, such as when it is at a minimum weight and thus sitting high in the water and/or has all retractable protuberances fully extended. For example, the controller 24 may access one or more stored vessel heights, such as a plurality of stored estimated heights based on one or more vessel conditions—e.g., positions of retractable protuberances and/or based on information related to the weight of the marine vessel such as fuel amount, etc.—where the controller 24 is then configured to select the appropriate estimated height based on the current vessel conditions (e.g., position of the retractable protuberance, fuel level, etc.). Alternatively, the controller 24 may be configured to measure or otherwise determine the current vessel height. For example, the controller 24 may determine the current height of the marine vessel from the waterline based on the ranging data. For instance, the height of one or more ranging sensors 72 from the waterline may be calculated based on the disparity, depth, and/or distance measurements and, for example, a known measurement angle of the sensor 72 relative to a measured pitch angle of the vessel (or an IMU may be co-located with or integrated into the ranging sensor 72). Where the position of the sensor 72 relative to the top of the marine vessel is known, the current height of the vessel may be determined as the height of the ranging sensor 72 from the waterline plus the distance of the sensor 72 from the top of the vessel. In still other embodiments, one or more ranging sensors may be positioned on the vessel 10 and configured to image the top portion of the marine vessel to identify any retractable protuberances or other objects on top of the vessel and to measure the vessel height too account for those objects.

The navigation control system 20 is configured to determine whether the marine vessel can navigate under the navigable opening based on whether the height of the navigable opening is at least a threshold greater than the at least one of the current height of the marine vessel from a waterline, the maximum height of the marine vessel from the waterline, or the estimated height of the marine vessel from the waterline. For example, the threshold may be sufficiently large to account for vessel movements due to waves or other environmental factors. Alternatively, the navigation control system 20 may be configured to measure the maximum vertical displacement of the marine vessel due to environmental conditions, such as waves, based on motion data from vessel motion sensor 60. The maximum vertical displacement may be added to the vessel height value prior to the comparison with the height of the navigable opening, thereby to account for the likely vertical motion of the vessel as it travels through the navigable opening.

If the vessel can safely navigate through the navigable opening, a navigation action is generated in step 105 corresponding to this determination. The navigation action could be a user alert displayed on operation console 22 that passage is safe or unsafe, along with corresponding instructions for passing through the navigable opening. In some autonomous embodiments, the navigation action includes a directive to an autonomous propulsion controller 25 to control propulsion of the marine vessel 10 through the navigable opening (such as according to a GPS track through the navigable opening). If, in step 104, the controller determines that the vessel cannot safely navigate through the navigable opening based on the opening's measured height and the vessel height (such as a minimum height of the vessel once all retractable protuberances are retracted), a navigation action is generated in step 105 based on a which corresponds to this determination. This navigation action could be a warning to the user on operation console 22 that passage is not safe. Alternatively or additionally, where the bridge is configured to raise or open, this may include automatically contacting the bridge operator to request raising of the bridge via Very High Frequency (VHF), Ultra High Frequency (UHF), or other frequency radios.

Alternatively, this may include instructing the user to contact the bridge and/or, for bridges controlled on a schedule, the next scheduled opening time or any applicable opening schedule for that bridge. For example, the opening schedule may be provided by GPS-based chart data or waterway guides stored or otherwise accessible to the controller 24. Alternatively, as described herein, the system 20 may be configured to detect objects in the ranging data, such as image data, indicating a bridge height. measurement tables or rulers indicating the height of the bridge based on the height of the waterline. The navigation control system 20 may be configured to use CVML or other image processing techniques to identify such measurement information in images obtained by the ranging sensor 72.

In some embodiments, the navigation action may be an alert to the user that the controller 24 found an alternative path for the vessel in chart data. Alternatively or additionally, the navigation action may include an instruction to the autonomous propulsion controller 25 to control propulsion of the marine vessel along an alternative route found in chart data. This instruction to autonomous control systems could be accompanied by an alert to the operator of marine vessel 10 displayed on operation console 22.

Figure 4:
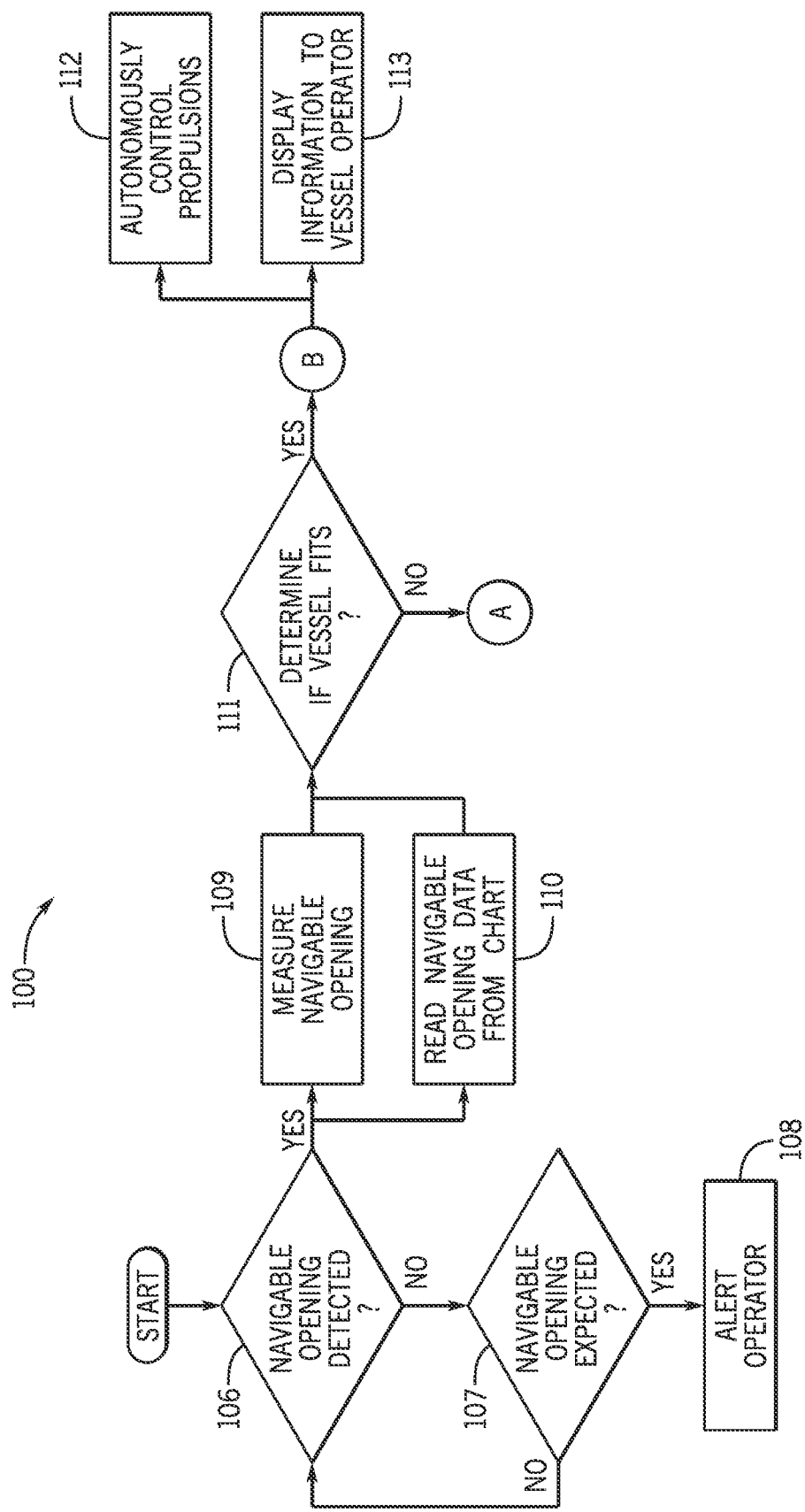

FIG. 4 depicts a more detailed embodiment of a method 100 of navigation control. After the visual detection mode is engaged as described above, the control system 20 determines if a navigable opening has been detected at step 106. If no navigable opening has been detected the control system at step 107 checks chart data and compares with GPS data provided by GPS receiver 40 to determine if a navigable opening should be detected by the system. If a navigable opening is expected, the system alerts the operator at step 108 of the identified discrepancy and/or of the likely location of the navigable opening. In certain embodiments, the control system 20 may further be configured to determine the type of navigable opening and/or its availability for passage. For example, the system 20 may be configured to determine if the bridge is open or in the process of opening or closing. For example, the control system may determine, such as motion detected in the ranging data from ranging sensor 72 or based on image classification, that the navigable opening is a bridge that is in process of opening or closing. If the system determines the bridge is closing, it may be configured to wait until it detects that the bridge has ceased movement to continue the navigation process.

If, at step 106, a navigable opening is detected, the control system 20 at step 109 proceeds to measure the size of the navigable opening, such as including one or more heights and widths of the opening. Alternatively, the control system could perform step 110 and read the size of the detected navigable opening from chart and GPS data or based on visual detection of height information in the ranging data, such as based on information in image data. For example, some bridges include measurement tables or rulers indicating the height of the bridge based on the height of the waterline. The navigation control system 20 may be configured to use CVML or other image processing techniques to identify such measurement information in images obtained by the ranging sensor 72.

Once the height and or other measurement information is determined, the control system 20 proceeds to step 111, which compares the size of the detected navigable opening to a known or measured size of the vessel 10 to determine whether the vessel can safely navigate through the navigable opening. The system at step 111 may compare both the height and width of the navigable opening to the height and width of the vessel 10 or may just compare the height of the navigable opening to the height of the vessel 10. Various embodiments and logic for determining vessel height are described above. For example, the value for height of the vessel 10 could be a preset value, such as a maximum height or various estimated heights associated with and selected based on various conditions or could be a value measured by ranging sensors 72 and processed by sensor processor 70 during step 111. For example, the control system 20 may execute logic to compare the maximum height of the vessel or the current height of the vessel to the height of the navigable opening. If the maximum or current height do not meet the navigation requirements, such as not being at least a threshold less than the tallest height of the opening, then the control algorithm may assess lesser heights, such as accounting for retraction of protuberances to reduce the vessel height. For example, the control system may compare the size of the vessel at a fully reduced height with all retractable protuberances retracted to the size of the navigable opening as a last resort for determining whether the vessel can fit without modifying the opening (e.g., where the navigable opening is a bridge, raising the bridge).

Depending on whether the vessel can safely navigate through the navigable opening, various navigation actions may be generated, including autonomously controlling propulsion at step 112 and/or displaying information to the vessel operator at step 113. For example, the control system 24 may chart a path through the navigable opening, such as a GPS-based track or other waypoint navigation path. Propulsion is then controlled accordingly to automatically propel the vessel through the navigable opening. Alternatively or additionally, information regarding the navigable opening may be displayed, such as on helm display 29 or on a user device connected to the navigation system, for instance via VesselView Mobile by Mercury Marine of Fond Du Lac, Wisconsin. Additional examples of navigation actions are described herein and illustrated in FIGS. 5-7 discussed below.

Figure 5:
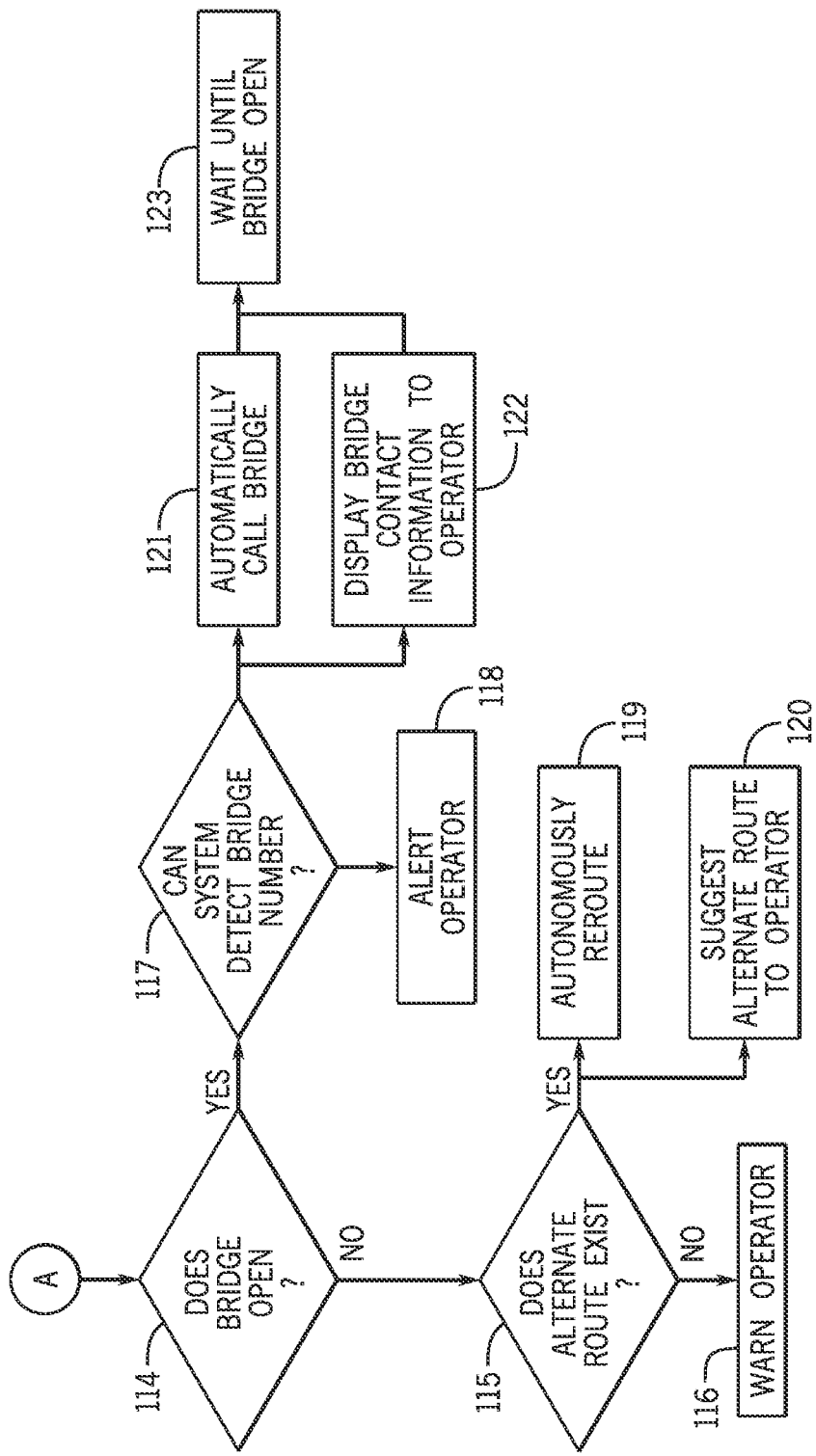

FIG. 5 illustrates one embodiment of steps that may be executed when it is determined that the vessel cannot navigate through the navigable opening based on the vessel height and the height of the opening, which may comprise part of the embodiment shown FIG. 4. The process is initiated, denoted at step A, when the control system determines at step 111 that the vessel cannot safely navigate through the navigable opening. At step 114 the control system 20 determines if the bridge can open. This may be determined based on chart and GPS data as described above, or in some embodiments may be determined the from the ranging data provided by ranging sensor 72. For example, the navigation control system 20 may be configured to use CVML or other image processing techniques to recognize that the bridge is an opening-type bridge.

If the bridge cannot open or the control system 20 cannot determine if the bridge can open, step 115 is executed to determine if an alternate route exists. For example, an alternate route may be identified from chart data and GPS data from GPS receiver 40. If the control system 20 cannot identify an alternate route for the vessel, a warning is displayed at step 116 on display 29, informing the operator of the determination that the vessel cannot navigate under the bridge or through the navigable opening allowing the operator to take appropriate action to find an alternate route. If, on the other hand, an alternate route is identified at step 115, the system moves to step 119 or alternatively step 120, depending on the embodiment. In Step 119, the control system utilizes the identified route data, along with chart and GPS data, to autonomously navigate the vessel 10 along the alternative identified route. The autonomous propulsion control system may be integrated into the navigation control system or may be separate. Alternatively, in step 120, the system suggests the identified alternate route to the operator utilizing display 29. Once the operator sees the alternate route on display 29 the operator can take appropriate action to navigate the vessel 10 along this route.

If, at step 114, the system determines that the bridge can open, then instructions are executed at step 117 to determine if the control system 20 can detect a bridge number. The bridge number may be detected via chart and GPS data, such as containing bridge contact information based on GPS information, or identifying the bridge call number in image data, or a combination of both. If a bridge number is detected, steps 121 or alternatively step 122 are executed to facilitate contacting the bridge. In step 121, the control system 20 automatically controls a communication device, such as a radio operating on Very High Frequency (VHF), Ultra High Frequency (UHF), or other frequency range, to contact the bridge operator to request raising of the bridge. Alternatively, the system executes step 122 to display the detected or identified bridge contact information to the operator, such as via display 29, allowing the operator to manually contact the bridge control. Alternatively, the system could also parse the schedule, if available, and wait for the next opening (and tell operator that is what is happening) or tell the operator the next scheduled opening is not for a long time and then proceed with auto-calling or prompting operator to call bridge. Finally, after step 121 or step 122, the system waits until the bridge is completely open at step 123 to implement the navigation action. For example, the control system 20 may be configured to detect when the bridge is sufficiently open via the ranging sensor 72, such as continually measuring the height of the opening bridge and determining, based on the vessel height, when the vessel can safely navigate through the navigable opening. Thereafter, the navigation action is executed, such as controlling propulsion of the marine vessel to autonomously navigate the vessel through the opening or generating a navigation alert via a user input device indicating that the marine vessel can navigate through the navigable opening.

Figure 6:
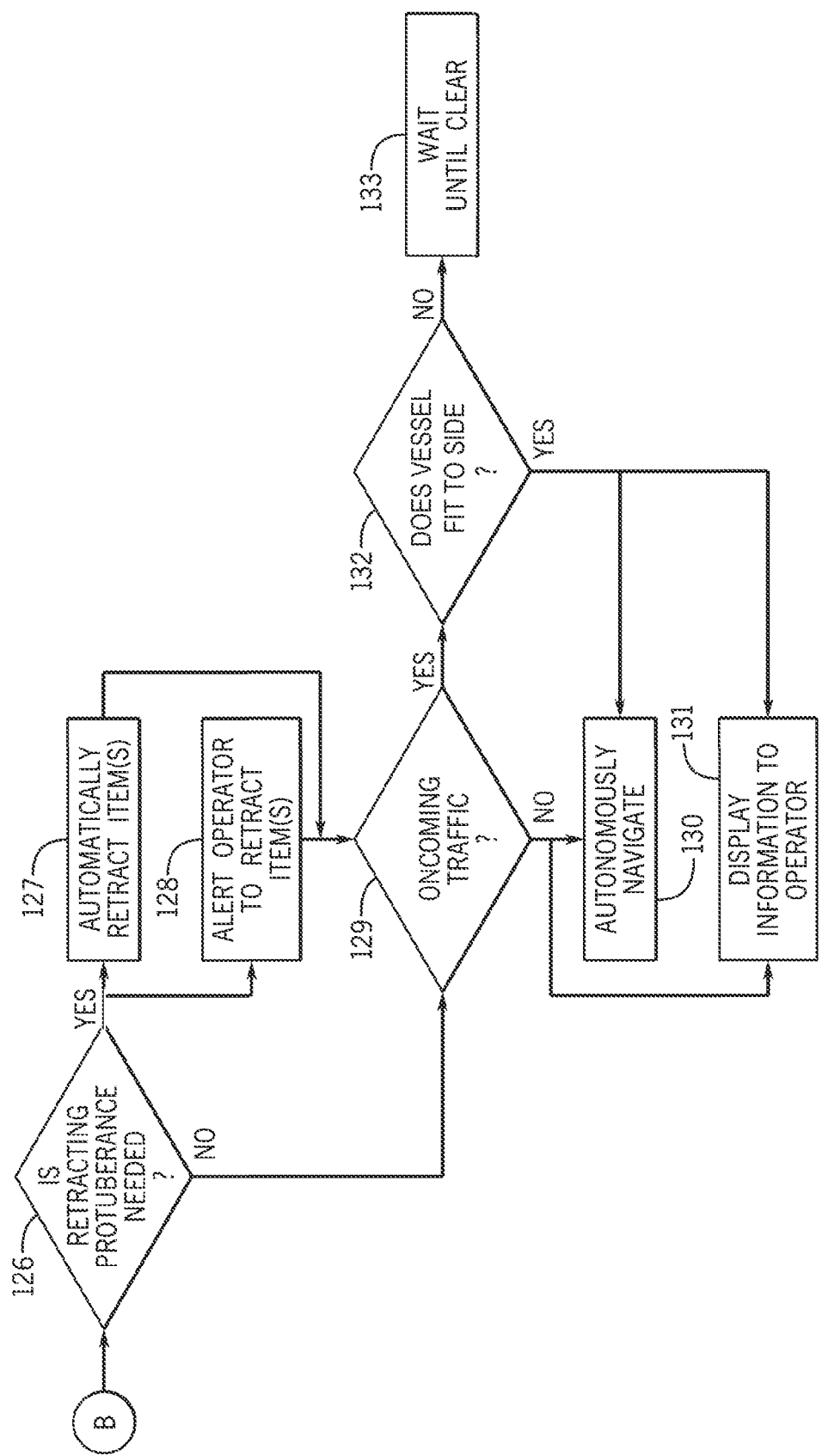

FIG. 6 displays additional logic that the control system 20 may execute once it is determined after determining in step 111 that the vessel 10 can safely navigate the navigable opening. Step 126 is executed to determine whether retraction of any protuberances is necessary for the vessel to navigate through. If reducing the height of the vessel is necessary based on the determination at step 111, the system performs steps to facilitate retraction of one or more retractable protuberances, such as a retractable bimini top, a foldable roof structure, or motorized antenna, removable fishing poles mounted on or sticking up above or to the side of the vessel, etc. Depending on the system configuration, such as whether the retractable protuberances are motorized or manual, step 127 or alternatively step 128 is executed to facilitate retraction. In step 127, the system automatically retracts any retractable items via a separate or integrated control system. For example, the control system 20 may automatically operate the motor 62 to retract the protuberance 61. Alternatively, step 128 may be executed to generate an alert advising the operator to retract the protuberances manually prior to proceeding through the navigable opening.

After completion of steps 127 or 128, or after the system determines at step 126 that no actions are needed to reduce the vessel height, the control system 20 may conduct a traffic analysis to determine whether navigation. The traffic analysis, performed in step 129, may be performed using CVML or image segmentation to identify other vessels in the direction of travel of the marine vessel 10. If oncoming traffic is detected within the navigable opening or stationary vessels are detected in or near the navigable opening, the system decides at step 132 whether the vessel can fit to the side of the traffic safely through the navigable opening. For example, it is common for vessels to operate in a station keeping mode in or near a navigable opening, whether waiting to cross through opening or anchored and fishing. In some embodiments, such as for relatively large vessels navigating in tight waterways, the system skips step 132 and performs step 133, waiting until no traffic is detected. If the control system 20 determines the vessel cannot fit safely to the side of oncoming traffic, based on the width of the vessel 10, the width of the navigable opening, and the width and location of the oncoming traffic, the system will perform step 133 to wait until the traffic has cleared the navigable opening.

If, at step 129, the system detects no oncoming traffic, or in step 132 it is determined that the vessel 10 can fit to the side of the oncoming traffic, then step 130 or alternatively step 131 is performed. In step 130, the autonomous propulsion controller 25 is engaged to autonomously navigate the vessel 10 through the navigable opening and to the proper side of traffic per marine navigation rules and norms. In step 131, the information that no traffic is detected or that the system has determined the vessel 10 can navigate safely past the traffic, is displayed to the operator on display 29, enabling the operator to take appropriate action. Alternatively or additionally, the user alert may further advise a user on which path to take through or where to position the vessel in the navigable opening.

Figure 7:
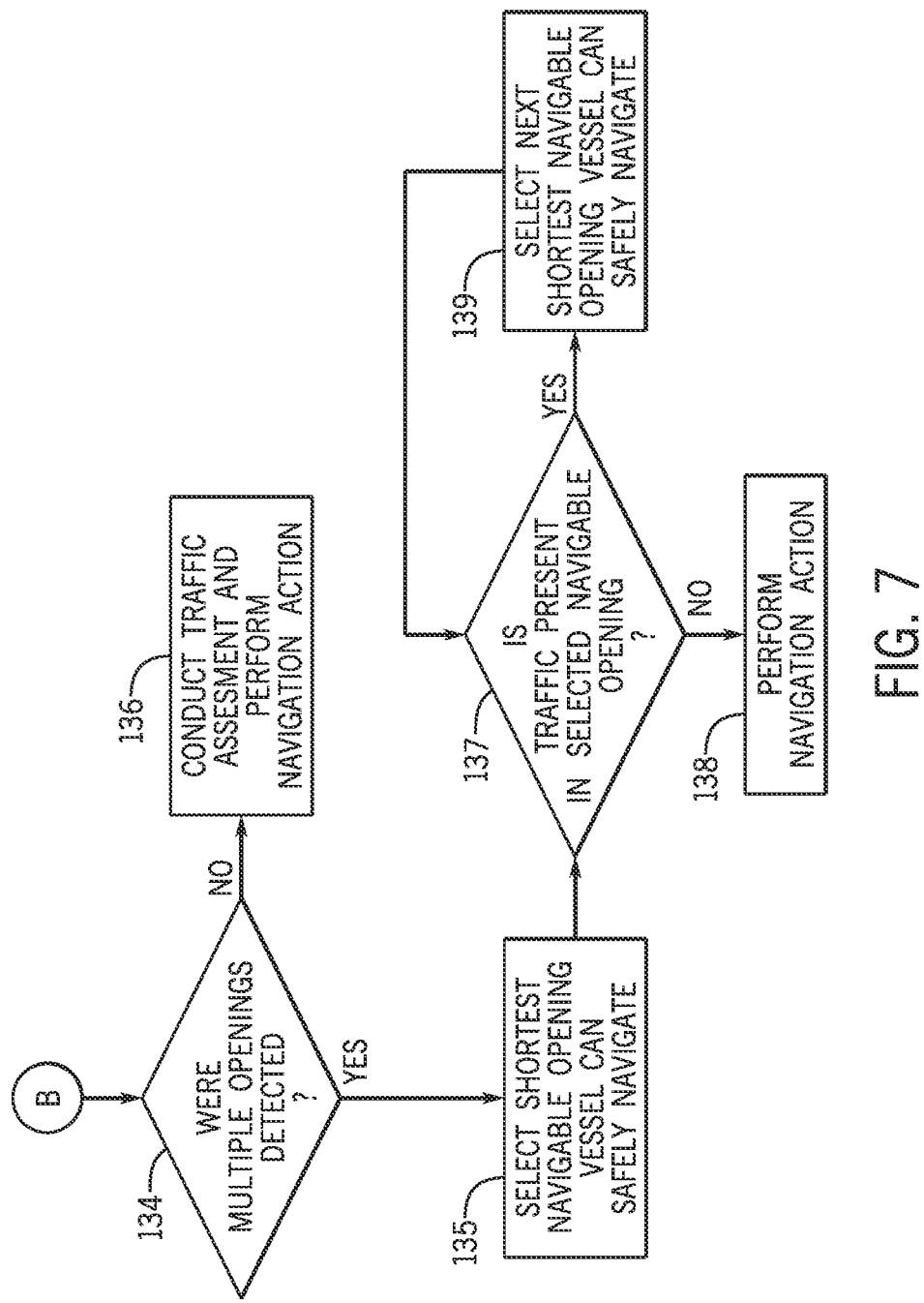

FIG. 7 demonstrates additional logic that may be performed after determining at step 111 that the vessel 10 can fit through the navigable opening. Instructions are executed at step 134 to determine whether multiple navigable openings are detected, such as multiple passageways under a bridge or multiple covered slips. For example, more than one navigable opening in an obstruction may be identified in the ranging data. If only one opening is detected, the control system may perform the retraction and/or traffic assessment described above in FIG. 6 (represented here as step 136).

If more than one opening is detected at step 134, the system conducts steps to select one of the navigable openings through which the marine vessel can and should navigate as a selected navigable opening. For example, the control system 20 may be configured to identify the smallest navigable opening the vessel can safely navigate through without conducting steps to reduce the vessel height or open the bridge. At step 135, the control system compares the heights of the multiple navigable openings to the vessel height, such as the maximum vessel height, and then selects the navigable opening with the smallest height through which the vessel, in its fully extended form, can safely navigate. Alternatively or additionally, the control system 20 may be configured to start with the starboard-most opening and work its way to the port-most opening. Thus, for example, the system 20 may be configured to identify the shortest opening to the port side through which the vessel can fit.

Step 137 is then executed to assess whether traffic is present in the selected navigable opening. For example, the traffic assessment may be performed as described above using the ranging data. If traffic is detected at step 139, the control system 20 selects the next shortest navigable opening through which the vessel can safely navigate. Steps 137 and 139 are repeated until a navigable opening is selected with no traffic identified. Thereafter, the final navigation action is performed at step 138, such as automatically controlling propulsion to move the vessel 10 through the opening or alerting the user on when and where to navigate the vessel, as described above.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A navigation system for a marine vessel comprising:
   at least one ranging sensor configured to image an area above a water surface around the marine vessel to generate ranging data;
   a control system configured to:
      detect a navigable opening in a path of the marine vessel based on the ranging data;

determine a height of the navigable opening based on the ranging data prior to the marine vessel reaching the navigable opening;

determine whether the marine vessel can navigate through the navigable opening based on the height of the navigable opening; and generate a navigation action based on whether the marine vessel can navigate through the navigable opening.

2. The system of claim 1, wherein the control system is configured to determine whether the marine vessel can navigate through the navigable opening based on a comparison of the height of the navigable opening to at least one of a current height of the marine vessel from a waterline, a maximum height of the marine vessel from the waterline, an estimated height of the marine vessel from the waterline, and a maximum vertical displacement of the marine vessel due to environmental conditions.

3. The system of claim 2, wherein the control system is further configured to determine the current height of the marine vessel from the waterline based on the ranging data.

4. The system of claim 2, wherein the control system is further configured to determine whether the marine vessel can navigate under the navigable opening based further on whether the height of the navigable opening is at least a threshold greater than the at least one of the current height of the marine vessel from the waterline, the maximum height of the marine vessel from the waterline, the estimated height of the marine vessel from the waterline, and the maximum vertical displacement of the marine vessel due to environmental conditions.

5. The system of claim 1, wherein the control system is further configured to determine a width of the navigable opening, and wherein determining whether the marine vessel can navigate through the navigable opening is further based on a comparison of the width of the navigable opening to a width of the marine vessel.

6. The system of claim 1, wherein the at least one ranging sensor includes at least two cameras arranged as stereo cameras, and wherein the control system is further configured utilize the ranging data generated based on images from the stereo cameras to determine the height of the navigable opening.

7. The system of claim 1, wherein the at least one ranging sensor includes at least one of a visual light camera, a lidar, a radar, and a laser scanner.

8. The system of claim 1, further comprising a GPS system configured to determine a current location of the marine vessel;

wherein the control system is further configured to determine the height of the navigable opening based on the current location of the marine vessel and mapping data identifying dimensions of the navigable opening.

9. The system of claim 1, wherein the navigation action generated by the control system includes at least one of generating an alert via a user interface device indicating whether the marine vessel can navigate through the navigable opening, automatically controlling at least one propulsion device on the marine vessel to propel the marine vessel through the navigable opening, and automatically controlling a communication device to instruct a bridge to open.

10. The system of claim 1, wherein the control system is further configured to, upon determining that the marine vessel cannot navigate through the navigable opening based on the height of the marine vessel, compare the height of the navigable opening to a reduced height of the marine vessel and determine whether the marine vessel can navigate through the navigable opening at the reduced height; and wherein the navigation action is further based on whether the marine vessel can navigate through the navigable opening at the reduced height.

11. The system of claim 10, wherein the navigation action includes automatically controlling retraction of a retractable protuberance on the marine vessel to reduce the height of the marine vessel to the reduced height and then automatically controlling at least one propulsion device on the marine vessel to propel the marine vessel through the navigable opening.

12. The system of claim 1, wherein the control system is further configured to detect multiple heights across a width of the navigable opening and to identify a navigable region through the navigable opening based on the multiple heights; and wherein the navigation action is based further on the navigable region.

13. The system of claim 1, wherein the control system is further configured to:

detect multiple navigable openings based on the ranging data;

determine a height of each of the multiple navigable openings;

determine whether the marine vessel can navigate through each of the multiple navigable openings based on the respective height thereof;

select one of the navigable openings through which the marine vessel can navigate as a selected navigable opening; and wherein the navigation action is based further on the selected navigable opening.

14. A navigation control method for a marine vessel, the method comprising:

imaging an area above a water surface around the marine vessel with at least one ranging sensor to generate ranging data;

detecting a navigable opening in a path of the marine vessel based on the ranging data;

determining a height of the navigable opening based on the ranging data prior to the marine vessel reaching the navigable opening;

determining whether the marine vessel can navigate through the navigable opening based on the height of the navigable opening and a height of the marine vessel; and generating a navigation action based on whether the marine vessel can navigate through the navigable opening.

15. The method of claim 14, wherein generating the navigation action includes generating a navigation alert via a user interface device indicating whether the marine vessel can navigate through the navigable opening.

16. The method of claim 14, wherein generating the navigation action includes automatically controlling at least one propulsion device on the marine vessel to propel the marine vessel through the navigable opening.

17. The method of claim 14, wherein generating the navigation action includes automatically controlling a communication device to instruct a bridge to open.

18. The method of claim 14, further comprising:

comparing the height of the navigable opening to a reduced height of the marine vessel and determining whether the marine vessel can navigate through the navigable opening at the reduced height; and wherein the navigation action includes, upon determining that the marine vessel can navigate through the navigable opening at the reduced height, automatically controlling a retractable protuberance on the marine vessel to reduce the height of the marine vessel.

19. The method of claim 14, wherein determining whether the marine vessel can navigate through the navigable opening includes comparing the height of the navigable opening to at least one of a current height of the marine vessel from a waterline, a maximum height of the marine vessel from the waterline, an estimated height of the marine vessel from the waterline, and a maximum vertical displacement of the marine vessel due to environmental conditions.

20. The method of claim 19, further comprising determining the current height of the marine vessel from the waterline based on the ranging data and determining the maximum vertical displacement based on vessel motion data from a motion sensor on the marine vessel.

21. The method of claim 19, further comprising determining whether the marine vessel can navigate under the navigable opening based further on whether the height of the navigable opening is at least a threshold greater than the at least one of the current height of the marine vessel from a waterline, the estimated height of the marine vessel from the waterline, and the maximum vertical displacement of the marine vessel due to environmental conditions.

22. The method of claim 14, further comprising determining a width of the navigable opening based on the ranging data, and wherein determining whether the marine vessel can navigate through the navigable opening is further based on a comparison of the width of the navigable opening to a width of the marine vessel.

23. The method of claim 14, further comprising detecting multiple heights across a width of the navigable opening and identifying a navigable region through the navigable opening based on the multiple heights and at least one of a current height of the marine vessel from a waterline, a maximum height of the marine vessel from the waterline, an estimated height of the marine vessel from the waterline, and a maximum vertical displacement of the marine vessel due to environmental conditions; and
    wherein the navigation action is based further on the navigable region.

24. The method of claim 14, further comprising:
detecting multiple navigable openings based on the ranging data;
determining a height of each of the multiple navigable openings;
determining whether the marine vessel can navigate through each of the multiple navigable openings based on the respective height thereof;
selecting one of the navigable openings through which the marine vessel can navigate as a selected navigable opening; and
wherein the navigation action is based further on the selected navigable opening.

\* \* \* \* \*